United States Patent [19]

Matsuwaka et al.

[11] Patent Number: 5,289,326
[45] Date of Patent: Feb. 22, 1994

[54] ROTARY HEAD CYLINDER PRODUCED BY INJECTION OF PRESSURIZED RESIN

[75] Inventors: Tetsunori Matsuwaka; Kenji Kobayashi; Takashi Ogawa; Tomonobu Ogino, all of Okayama; Motoo Ohmori, Akaiwa; Hiroshi Hanafusa, Wake, all of Japan

[73] Assignee: Matsushita Electric Industrial Co., Ltd., Osaka, Japan

[21] Appl. No.: 740,402

[22] Filed: Aug. 5, 1991

[30] Foreign Application Priority Data

Aug. 9, 1990 [JP] Japan .................... 2-212541

[51] Int. Cl.$^5$ .............................. G11B 5/52
[52] U.S. Cl. ............................. 360/107
[58] Field of Search ................. 360/107, 130.24

[56] References Cited

U.S. PATENT DOCUMENTS

| | | |
|---|---|---|
| 4,664,900 | 5/1987 | Miyazaki et al. |
| 4,885,653 | 12/1989 | Kato |
| 4,934,577 | 6/1990 | Sugimoto et al. |

FOREIGN PATENT DOCUMENTS

| | | |
|---|---|---|
| 63-161558 | 7/1988 | Japan . |
| 1094114 | 12/1967 | United Kingdom . |
| 1223469 | 2/1971 | United Kingdom . |
| 1260853 | 1/1972 | United Kingdom . |
| 1357982 | 6/1974 | United Kingdom . |
| 1486761 | 9/1977 | United Kingdom . |
| 2003334 | 3/1979 | United Kingdom . |
| 1593031 | 7/1981 | United Kingdom . |

Primary Examiner—A. J. Heinz
Attorney, Agent, or Firm—Stevens, Davis, Miller & Mosher

[57] ABSTRACT

An aluminum alloy ring (the outside diameter $D_1$) which is an element of a rotary head cylinder, is inserted in a cavity (the inside diameter $D_2 > D_1$) of a fixed metal mold, with a clearance gap ($D_2 - D_1$) Then, the cavity of the fixed metal mold is closed by a movable metal mold, and the inner space of the aluminum alloy ring is filled with molten synthetic resin material. The filling resin is pressurized so that the aluminum alloy ring elastically expands until the outer diameter thereof $D_1$ becomes exactly or almost equal to $D_2$. After that, the filling synthetic resin material is cooled. Thus, the aluminum alloy ring and the synthetic resin material are integrated, resulting in a rotary head cylinder molding.

10 Claims, 3 Drawing Sheets

ROTARY HEAD CYLINDER PRODUCED BY INJECTION OF PRESSURIZED RESIN

BACKGROUND OF THE INVENTION

1. Field of the Invention

The present invention relates to a rotary head cylinder for a magnetic recording and/or playing-back device, such as a video tape recorder, and more particularly to a rotary head cylinder which guides the magnetic-tape running round a portion of the cylinder's outer periphery and which is, with a magnetic head, suited for recording and/or reproducing signals such as video signals on magnetic tapes, and the method for manufacturing such rotary head cylinders.

2. Description of the Related Art

Recently, rotary head cylinders (hereinafter, referred to as "cylinders") have been worked on to reduce the weight, along with the trend of a smaller and lighter body of a magnetic recording and/or playing-back device. An idea has been proposed that the outer ring of a cylinder for touching a tape be molded of a material with high resistance against wear-and-abrasion and corrosion, such as high tensile aluminum alloy, and that the inner portion be molded of a material, such as aluminum alloy for die casting or synthetic resins.

A known method for manufacturing cylinders will be explained, hereinafter, with reference to FIGS. 1, 2. FIG. 1 shows a known method for manufacturing cylinders. FIG. 2 is a sectional view of a cylinder manufactured in the known method as shown in FIG. 1. A fixed metal mold 1 has a cavity. A movable metal mold 2 has a projection and moves to close the cavity of the fixed metal mold 1. An outer ring 3 providing a surface contacting with tapes and made of high tensile aluminum alloy is beforehand shaped in desired dimensions (outside diameter, thickness, and width). Reference numeral 4 refers to filling holes through which a material such as die-casting aluminum or a synthetic resin fills the cavity of the fixed metal mold 1.

A cylinder is manufactured in the above manufacturing device as follows. The outer ring 3 of the cylinder, made beforehand of high tensile aluminum alloy in a desired shape, is put in the cavity of the fixed metal mold 1, and the projected movable die 2 moves to close the cavity. Thus the molding cavity is formed.

Next, a material such as die-casting aluminum alloy or a synthetic resin is injected through filling holes 4. Then, after cooled, a cylinder with its outer ring 3 and inner ring 5 integrally coupled, as shown in FIG. 2, is taken out.

Finally, the outer periphery of the cylinder is ground, and grooves and head windows are defined by machine cutting or such, to be finished into a rotary head cylinder.

In the conventional method, the outer ring 3 and the inner ring 5 do not couple strongly enough, so that the outer and inner rings may slide on each other and, in some case, come apart. Therefore, the inner surface of the outer ring 5 has to be rugged, e.g. under the knurling process, to reinforce the coupling of the outer and inner rings 3, 5. However, such a special process still fails to enhance the coupling rigidity up to a satisfactory level and requires more work, lowering the work-efficiency.

SUMMARY OF THE INVENTION

An object of present invention is to solve the problems explained above by supplying a rotary head cylinder and the method for manufacturing the same which easily provides a rigid-enough coupling of the outer and inner rings without any special processing onto the outer ring.

Another object of this invention is to provide a rotary head cylinder which will not warp or become eccentric due to the difference in thermal expansion degrees of the two rings.

A still another object is to provide a rotary head cylinder which is unlikely to be electrostatically charged by the sliding friction between the rotary head cylinder and a magnetic tape guided by the cylinder in use, i.e., to provide a rotary head cylinder which hardly produces noises in the play-back.

The above and other objects and features of the invention will appear in the following description and appended claims, reference being made to the accompanying drawings forming a part of this specification wherein like reference characters designate corresponding parts in the several views.

DESCRIPTION OF THE PREFERRED EMBODIMENT

Figure 1:
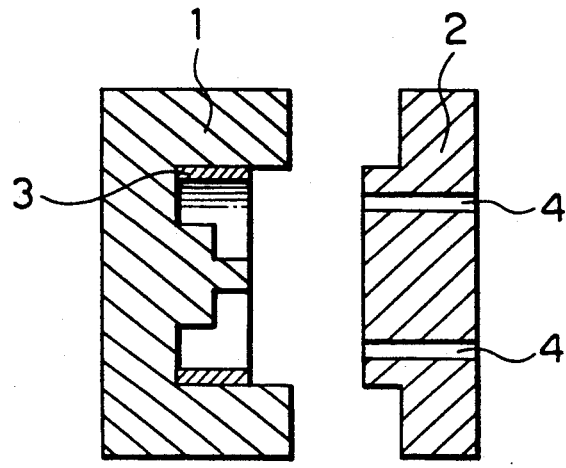
FIG. 1 is a sectional view of an arrangement in a known method for manufacturing a rotary head cylinder.
Figure 2:
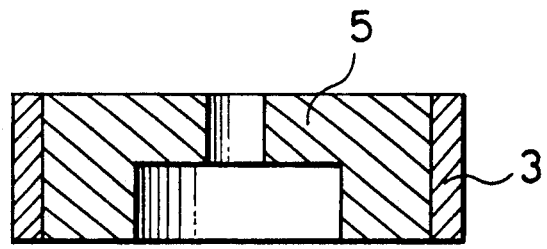
FIG. 2 is a sectional view of a rotary head cylinder manufactured in the same known method as shown in FIG. 1.
Figure 4:
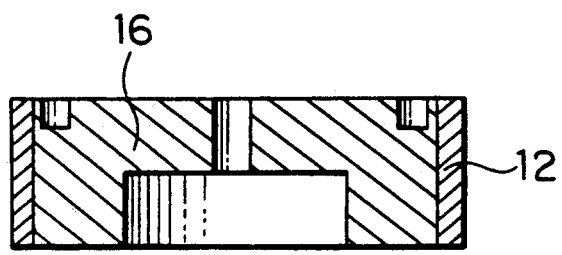
FIG. 4 is a sectional view of a rotary head cylinder manufacture in the method as shown in FIGS. 3A to 3D.
Figure 3A:
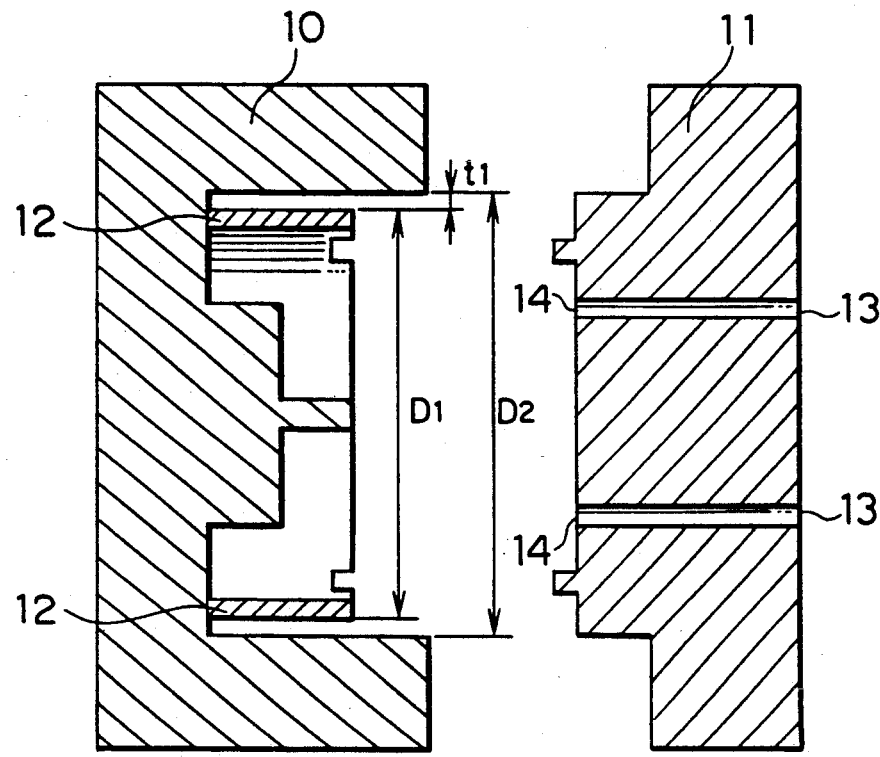
FIGS. 3A to 3D are sectional views, illustrating each of the steps in a method for manufacturing a rotary head cylinder of the present invention.
Figure 3B:
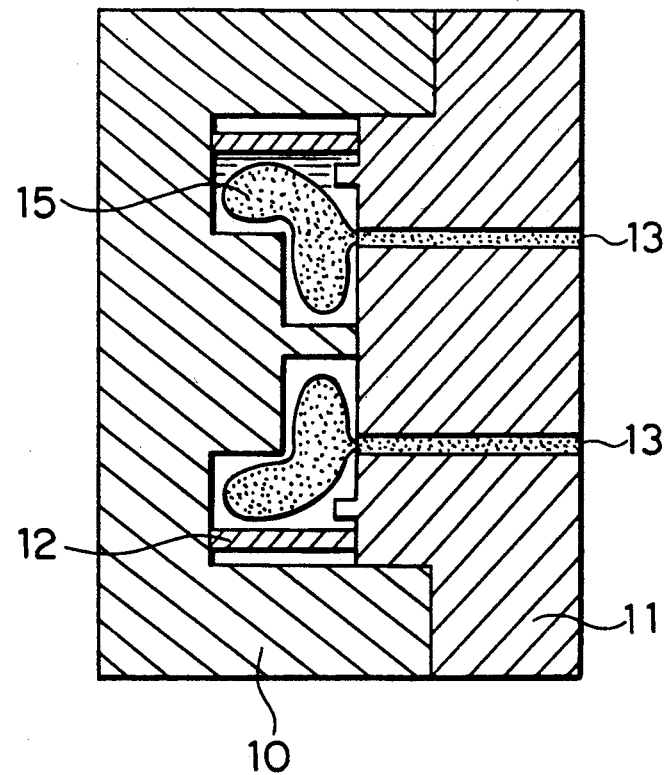

Referring to FIGS. 3A to 3B, a fixed die 10 has a cavity with the inside diameter $D_2$, and a movable metal mold 11 has a projection, and moves to close the cavity of the fixed metal mold 10. The fixed and movable metal molds 10, 11 carried pins or the like (not shown) which provided the molding with holes, grooves or projections as mounting holes for head bases or as locating dowels.

An outer ring 12 was provided with a surface contacting with tapes and was made of high tensile aluminum alloy with high resistance against wear-and-abrasion and corrosion. The outer ring 12 was beforehand shaped in desired dimensions: outside diameter ($D_1$), thickness, and width. For the material of the high tensile aluminum, an aluminum including silica (several percents) was best suited.

An inner ring 16 was made of a synthetic resin 16 which had small mold-shrinkage and a similar co-efficient of linear thermal expansion to that of aluminum alloy.

The synthetic resin is desired to have particular properties: strength to bear cutting force; heat resistance, coefficient of linear thermal expansion and dimensional stability for withstanding environment changes; and chemical resistance for staying unaffected by adhesive and curing agent. This embodiment employs polyether imide, liquid crystal polymer and polycarbonate as shown in the following table.

| | Mold Shrinkage | Coefficient of Linear Thermal Expansion (mm/mm · °C.) |
|---|---|---|
| Polyether Imide | $2 \times 10^{-3}$ | $2 \times 10^{-5}$ |
| Liquid Crystal Polymer | $3 \times 10^{-3}$ | $2 \times 10^{-5}$ |
| Polycarbonate | $6 \times 10^{-3}$ | $7 \times 10^{-5}$ |
| Aluminum | — | $2.2 \times 10^{-5}$ |

The above synthetic resins were employed for the inner rings 16 so as to select appropriate shrinkage materials. If a large shrinkage material is used, it will cause loose coupling between the inner and outer rings when shrunk. In such case of large shrinkage, the two rings may slide on each other and might come apart. Or, an inner ring of a material with a coefficient of linear thermal expansion far from that of aluminum will cause a warped or eccentric rotary head cylinder.

The synthetic resins employed in the embodiment included some additive such as carbon or glass fibers (e.g. 10 to several 10 $\mu$m thick, 70 to 100 $\mu$m long). As known, the friction between a cylinder and a tape generates static electricity. When static electricity charged on the cylinder becomes great, it produces noises on loops of the magnetic head and thus degrades the playback picture. Therefore, in order to avoid such trouble, the synthetic resin 15 (inner ring 16) contained electrically conduction carbon fibers of about 5 to several 10% (10 to 20% in the embodiment), so that the cylinder was hardly charged with static electricity. Also, to enhance the strength of the cylinder, the synthetic resin included glass fibers about 5 to several 10% (10 to 20% in the embodiment).

The synthetic resin 15 was applied through filling holes 13 and then injection gates 14 into the cavity of the fixed die 10. The injection gates 14 were designed to close when the pressure inside the cavity rises by feeding the synthetic resin to a pre determined value (910 kgf/cm$^2$ in the embodiment).

Now, how a cylinder was manufactured with the above-described device will be described step by step.

First Step (insertion)

Referring to FIG. 3A, the outer ring with the outside diameter $D_1$ was inserted in the fixed die's cavity with the inside diameter $D_2$, forming a clearance t ($=t_1$) between the outer ring and the fixed die.

That is:

$$D_1 < D_2, D_2 - D_1 = t_1$$

Experiments had shown that the appropriate clearance t was between 0.1 to 0.4 mm. A smaller clearance will cause a loose coupling of the rings, and a greater clearance will cause cracks on the outer ring.

Second Step (injection)

Referring to FIG. 3B, the movable metal mold 11 was moved to close the cavity of the fixed metal mold 10 and form a molding cavity. The molten synthetic resin was injected at a pressure (about 780 kgf/cm$^2$) from the filling holes 13 through the injection gates 14 into the molding cavity.

Third Step (processing)

Figure 3C:
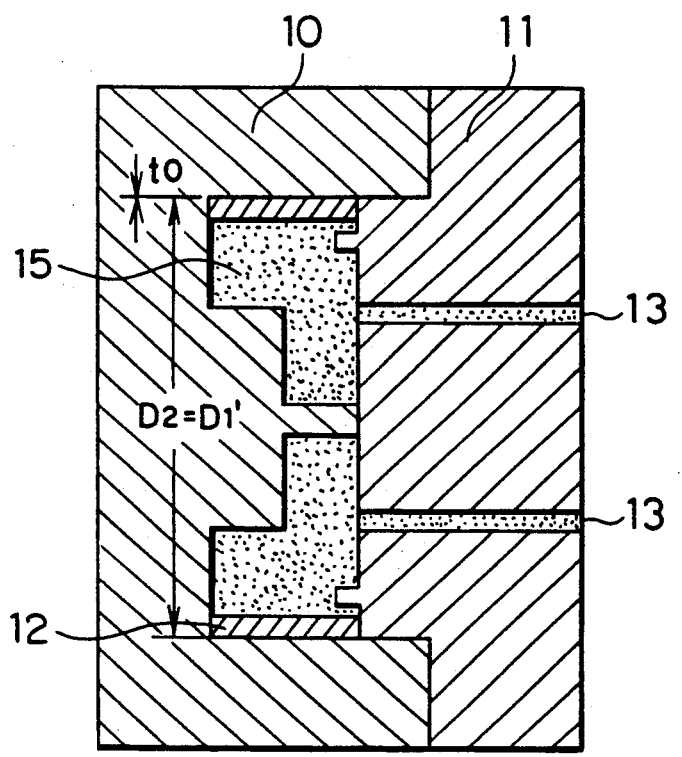
Figure 3D:
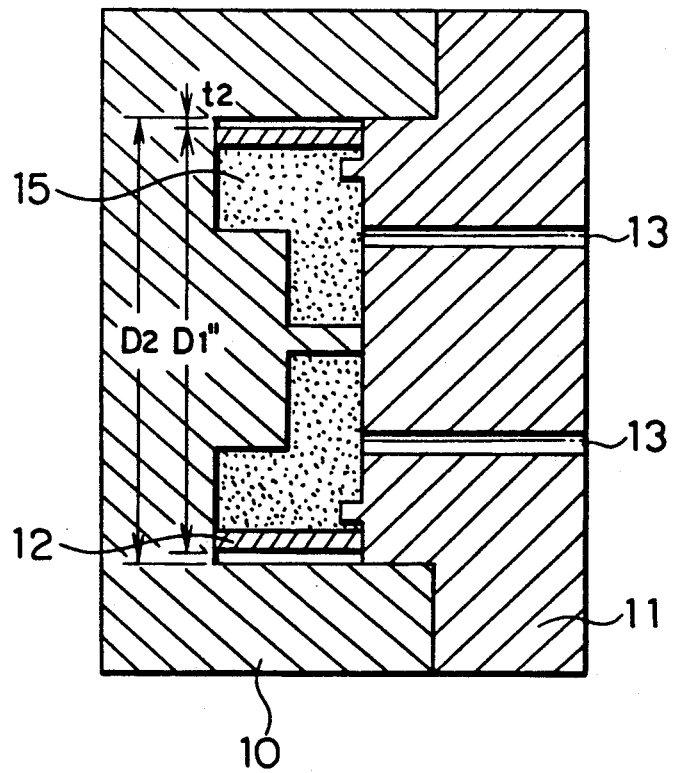

Referring to FIG. 3c, after the molding cavity was filled with heat-melted synthetic resin 15, the filling process was continued by adding pressure (about up to 910 kgf/cm$^2$) to elastically expand the outer ring 12 ($D_1'$) unitl the clearance t became exactly or almost zero.

That is:

$$D_1' = D_2, t = 0 \text{ or}$$

$$D_1' \approx D_2, t \approx 0$$

Fourth Step (cooling)

Referring to 3D, when the pressure inside the cavity of the fixed metal mold 10 reached a predetermined value and the clearance t became exactly or almost zero, the injection gates 14 were closed. The molding was cooled and solidified. Here, the synthetic resin 15, with a small mold-shrinkage, solidified with its size almost unchanged. The outer ring 12 fastened round the inner ring 16 by the restoration force occurring because of the elastic deformation thereof. Thus, the rigid coupling of the outer and inner rings 12, 16 was secured.

That is:

$$D_2 > D_1'' > D_1, t_1 > t_2$$

After these steps, the ring was taken out and was subjected to machine processing so that the outer periphery of the ring was turned and grooved, and head windows are formed. Thus, the ring was finished into a rotary head cylinder.

It is apparent that die-casting aluminum can be used in place of the synthetic resins for a material of the inner ring 16 in the same method as the embodiment.

Also, this invention is not limited to the manufacture of the upper cylinders used as an example in the above description, but can be applied to the manufacture of the lower cylinders, as well.

It is further understood by those skilled in the art that the foregoing description is made as to a preferred embodiment of the disclosed invention and that various changes and modifications may be made according to the invention without departing from the spirit and scope thereof.

What is claimed is:

1. A rotary head cylinder comprising:
   an aluminum alloy ring, and
   a synthetic resin material molded in the inner space of said aluminum alloy ring and integrated therewith, and which resin has both a small molding-shrinkage and a coefficient of linear thermal expansion similar to that of said aluminum alloy, wherein said synthetic resin material is one selected from the group consisting of polyether imide, liquid crystal polymer and polycarbonate.

2. A rotary head cylinder comprising:
   an aluminum alloy ring, and
   a synthetic resin material molded in the inner space of said aluminum alloy ring and integrated therewith, and which resin has both a small molding-shrinkage and a coefficient of linear thermal expansion similar to that of said aluminum alloy, wherein said synthetic resin material contains carbon fibers.

3. A rotary head cylinder comprising:

an aluminum alloy ring, and a synthetic resin material molded in the inner space of said aluminum alloy ring and integrated therewith, and which resin has both a small molding-shrinkage and a coefficient of linear thermal expansion similar to that of said aluminum alloy, wherein said synthetic resin material contains glass fibers.

4. A rotary head cylinder comprising:

an aluminum alloy ring, and a synthetic resin material molded in the inner space of said aluminum alloy ring and integrated therewith, and which resin includes electrically conductive substances.

5. A rotary head cylinder comprising:

an aluminum alloy ring, and a synthetic resin material molded in the inner space of said aluminum alloy ring and integrated therewith, and which resin includes conductive substances, wherein said synthetic resin material is one selected from the group consisting of polyether imide, liquid crystal polymer and polycarbonate.

6. A rotary head cylinder comprising:

an aluminum alloy ring, and a synthetic resin material molded in the inner space of said aluminum alloy ring and integrated therewith, and which resin includes conductive substances, wherein said synthetic resin material contains carbon fibers.

7. A rotary head cylinder comprising:

an aluminum alloy ring, and a synthetic resin material molded in the inner space of said aluminum alloy ring and integrated therewith, and which resin includes conductive substances, wherein said synthetic resin material contains glass fibers.

8. A rotary head cylinder comprising:

an aluminum alloy ring, and a synthetic resin material molded in the inner space of said aluminum alloy ring and integrated with said aluminum alloy ring, said ring being elastically expanded radially by 0.1 to 0.4 mm at a time when said synthetic resin material is molded and pressurized in an inner space of said ring, whereby an integration of said synthetic resin material with said ring is improved after said synthetic resin has solidified, and wherein said synthetic resin material is one selected from the group consisting of polyether imide, liquid crystal polymer and polycarbonate.

9. A rotary head cylinder comprising:

an aluminum alloy ring, and a synthetic resin material molded in the inner space of said aluminum alloy ring and integrated with said aluminum alloy ring, said ring being elastically expanded radially by 0.1 to 0.4 mm at a time when said synthetic resin material is molded and pressurized in an inner space of said ring, whereby an integration of said synthetic resin material with said ring is improved after said synthetic resin has solidified, and wherein said synthetic resin material contains carbon fibers.

10. A rotary head cylinder comprising:

an aluminum alloy ring, and a synthetic resin material molded in the inner space of said aluminum alloy ring and integrated with said aluminum alloy ring, said ring being elastically expanded radially by 0.1 to 0.4 mm at a time when said synthetic resin material is molded and pressurized in an inner space of said ring, whereby an integration of said synthetic resin material with said ring is improved after said synthetic resin has solidified, and wherein said synthetic resin material contains glass fibers.

* * * * *